United States Patent
Adamczewski et al.

(10) Patent No.: US 6,193,123 B1
(45) Date of Patent: Feb. 27, 2001

(54) FLAT GOODS CLAMPING AND TRANSPORTING APPARATUS

(76) Inventors: Zbigniew Jozef Adamczewski; Ruth Esther Gosey, both of 1115 St. Louis Ave. #1, Long Beach, CA (US) 90804

( * ) Notice: Subject to any disclaimer, the term of this patent is extended or adjusted under 35 U.S.C. 154(b) by 0 days.

(21) Appl. No.: 09/499,272

(22) Filed: Feb. 7, 2000

Related U.S. Application Data

(63) Continuation-in-part of application No. 09/356,993, filed on Jul. 19, 1999.

(51) Int. Cl.[7] .................................................. B60R 9/00
(52) U.S. Cl. .................... 224/405; 224/501; 224/510; 224/523; 224/536; 224/537; 224/554; 224/570; 224/571; 296/3; 211/41.14
(58) Field of Search .................................. 224/403, 405, 224/281, 495, 501, 510, 522, 533, 523, 536, 537, 560, 561, 548, 552, 554, 545, 546, 567, 570, 571; 296/3; 211/41.14, 41.15; 410/34, 35, 127, 128

(56) References Cited

U.S. PATENT DOCUMENTS

| | | | |
|---|---|---|---|
| 1,879,513 | * | 9/1932 | Rothholz .................................. 296/3 |
| 2,887,231 | * | 5/1959 | Schodorf, Sr. ..................... 211/41.14 |
| 3,412,867 | * | 11/1968 | Barkow ............................... 211/41.14 |
| 3,424,487 | * | 1/1969 | Pector et al. ............................. 296/3 |
| 3,719,284 | * | 3/1973 | Rasmusson et al. .......... 211/41.14 X |
| 4,007,864 | * | 2/1977 | Hreha ................................. 224/560 X |
| 4,927,032 | * | 5/1990 | Mercure ............................. 211/41.14 |
| 4,942,989 | * | 7/1990 | Miller .................................... 224/560 |
| 5,297,685 | * | 3/1994 | Ramey ............................... 211/41.15 |
| 5,450,956 |   | 9/1995 | Peckenpaugh, Sr. et al. . |
| 5,482,424 | * | 1/1996 | Jones et al. ....................... 224/510 X |

FOREIGN PATENT DOCUMENTS

| | | | |
|---|---|---|---|
| 1115670 | * | 1/1982 | (CA) .................................... 224/510 |
| 2734511 | * | 1/1982 | (DE) .................................... 224/323 |
| 0314632 |   | 5/1989 | (EP) . |
| 0489122 |   | 3/1996 | (EP) . |
| 0580075 |   | 7/1996 | (EP) . |
| 0691911 |   | 4/1999 | (EP) . |
| 2624808 | * | 6/1989 | (FR) .................................... 224/324 |

* cited by examiner

*Primary Examiner*—Gregory M. Vidovich
(74) *Attorney, Agent, or Firm*—Gene Scott-Patent Law & Venture Group

(57) ABSTRACT

An apparatus for carrying panel materials adjacent to a truck side panel has a stationary workpiece resting surface mounted on the truck side panel and a movable workpiece clamping and supporting device positioned adjacent to the stationary workpiece resting surface and mounted to the truck. A motive device such as a motor engages the truck and is connected for moving the workpiece clamping and supporting device toward and away from the workpiece resting surface for sandwiching a workpiece between the workpiece resting surface and the workpiece clamping and supporting device for enabling the truck to transport the workpiece.

10 Claims, 3 Drawing Sheets

FLAT GOODS CLAMPING AND TRANSPORTING APPARATUS

The present application is a continuation-in-part of a previously filed utility patent application having Ser. No. 09/356,993 and an assigned filing date of Jul. 19, 1999 and which contains subject matter substantially the same as that described and claimed in the present application is herein identified.

BACKGROUND OF THE INVENTION

1. Field of the Invention

This invention relates generally to materials transporting devices, and more particularly to such a device for clamping panels onto the exterior of a truck for transporting such goods.

2. Description of Related Art

The following art defines the present state of this field:

Peckenpaugh, Sr., et al., U.S. Pat. No. 5,450,956 describes an adjustable, telescopic, carrying and storage case of variable and fixed length including a hollow adjustable, telescopic front member of variable length and a hollow adjustable, telescopic rear member of variable length that can be separated or connected tightly. The case is adjustable in length and can be used at a maximum length and at a minimum length for ease in transportation. The case is preferably used for carrying and storing different items including telescopic fishing rod assemblies. The telescopic front member comprises a first container portion and a plurality of adjustable front telescopic locking sections which are placed in an interlocking relationship through a plurality of annular tapered locking surfaces and a number of annular locking surfaces. The telescopic rear member comprises a second container portion and a plurality of adjustable rear telescopic locking sections which are placed in an interlocking relationship through a plurality of annular tapered locking surfaces and a number of annular locking surfaces.

Emer, EP0314632, describes an apparatus for the handling of sheets made of glass or other materials, as panels and the like, shaped as plates and to be used for supply said sheets or plates in working lines and to be mounted on an overhead traveling crane running along the working line. The apparatus comprises a frame provided with pneumatic devices for griping a sheet or plate at least two chains for the support of the frame and cooperating with means apt to case the suspended sheet or plate to be rotated, said chains being supported, through a support telescopic device of an adjustable length, by a truck traveling along the rail beams of the overhead traveling crane.

Lautenschlager, EP0580075, describes an automatic telescopic device for drawer runners, comprising a guide rail formed by a profile section turned over from sheet metal to be secured to the carcass wall, said guide rail having a profiled flange bent upwardly from a profiled flange projecting substantially at right angles and horizontally from the carcass wall and engaging from below the associated runner formed by a hollow profile section open at its underside to be removably secured to the drawer, and provided in the interior of the runner with raceways for rolling elements which are held in an elongated cage and can roll, on the one hand, on the raceways of the guide rail and, on the other hand, on raceways formed by associated regions of the inner surface of the runner, thereby allowing for longitudinal displacement of the runner relative to the guide rail, a component which can pivot between two end positions and is biased bistably into the end positions by means of spring arrangement being provided and having an open-ended recess for a projection projecting downwardly from the runner in a portion projecting beyond the horizontal profiled flange of the guide rail into the interior of the carcass, and the projection and the pivoting component being arranged relative to one another in relation to the runner or the guide rail in such a manner that, when the runner is displaced from the open-drawer position, as it approaches the closed position, the projection moves into the recess in the pivoting component in the end position associated with the open-drawer position and then, once the dead center of the pivoting component has been passed, is driven resiliently together with the latter into the closed-drawer position, characterised in that the pivoting component is mounted in a separate elongated housing secured to the guide rail so as to pivot about a substantially perpendicular axis and that a detent is provided immediately in front of the recess in the pivoting component as viewed in the direction of insertion of the drawer, wherein said detent is withdrawn into the housing into the path of the projection projecting from the runner in the end position associated with the open-drawer position, and in the end position associated with the closed-drawer position projects into the path of the projection, but can be traversed by the projection in the direction of insertion by means of resilient deformation.

Lechevallier, EP0691911 describes a removable frame for loading, unloading and moving container's of goods on trucks or wagons without typical lifting machinery such as cranes, gantries and such. It permits unload directly onto the ground. The invention is characterized by arrangement of a frame encompassing the load. Two lifting surfaces are provided with lateral spacing between them and are placed transverse of the vehicle's axle. Each of the surfaces is lifted by a telescoping jack and facility for locking the load in place is provided.

The prior art teaches a very wide range of materials storage and handling systems. However, the prior art does not teach that an actuated clamping device may be mounted onto a truck for clamping panel goods for transport. The present invention fulfills these needs and provides further related advantages as described in the following summary.

SUMMARY OF THE INVENTION

The present invention teaches certain benefits in construction and use which give rise to the objectives described below.

The present invention provides an apparatus for carrying panel materials adjacent to a truck side panel and comprises a stationary workpiece resting surface mounted on the truck side panel and a movable workpiece clamping and supporting device positioned adjacent to the stationary workpiece resting surface and mounted to the truck. A motive device such as a motor engages the truck and is connected for moving the workpiece clamping and supporting device toward and away from the workpiece resting surface for sandwiching a workpiece between the workpiece resting surface and the workpiece clamping and supporting device for enabling the truck to transport the workpiece.

A primary objective of the present invention is to provide a panel carrying device having advantages not taught by the prior art.

Another objective is to provide such a device that is mounted to a truck body and holds the panel for transport.

A further objective is to provide such a panel carrying device that is able to open to accept a load and to close to clamp the load on a truck.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
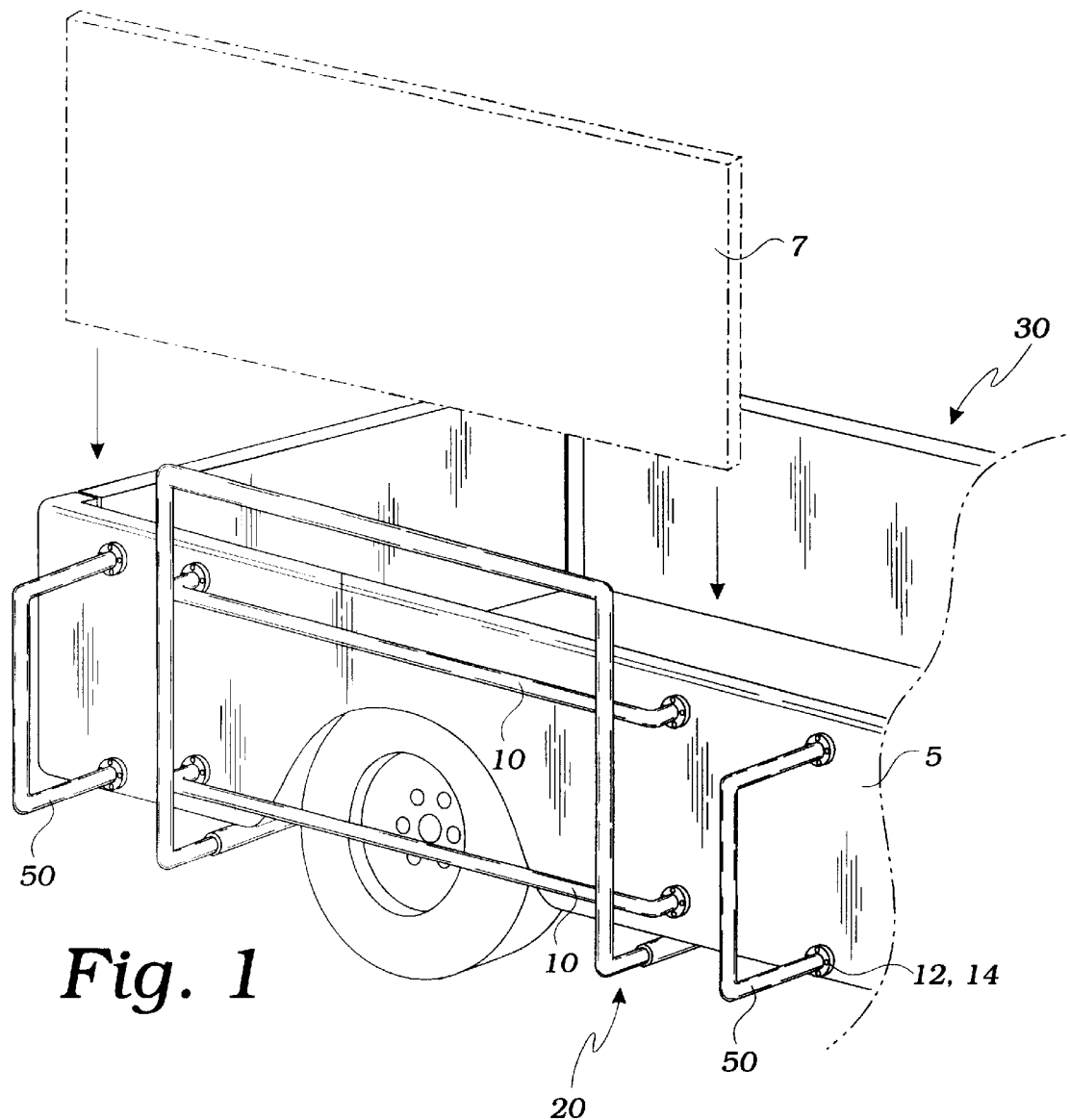
FIG. 1 is a perspective view of the preferred embodiment of the present invention showing how a panel may be inserted into the invention for transport.
Figure 2:
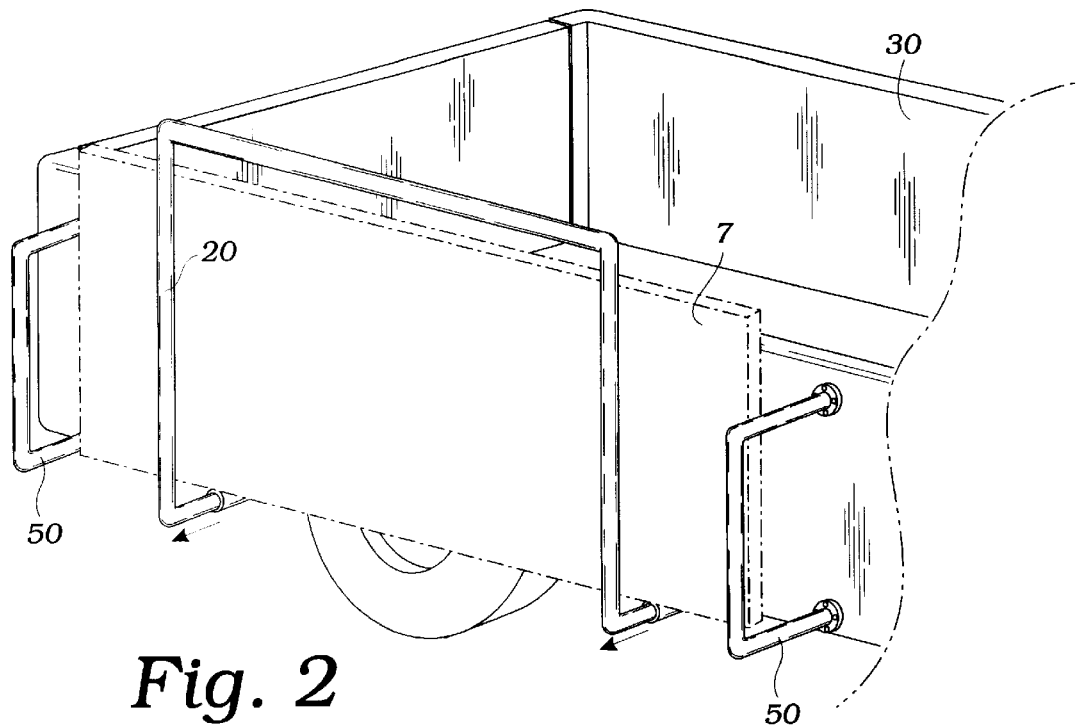
FIG. 2 is similar to FIG. 1 with arrows illustrating an opening movement of the invention for inserting a panel into the invention.
Figure 3:
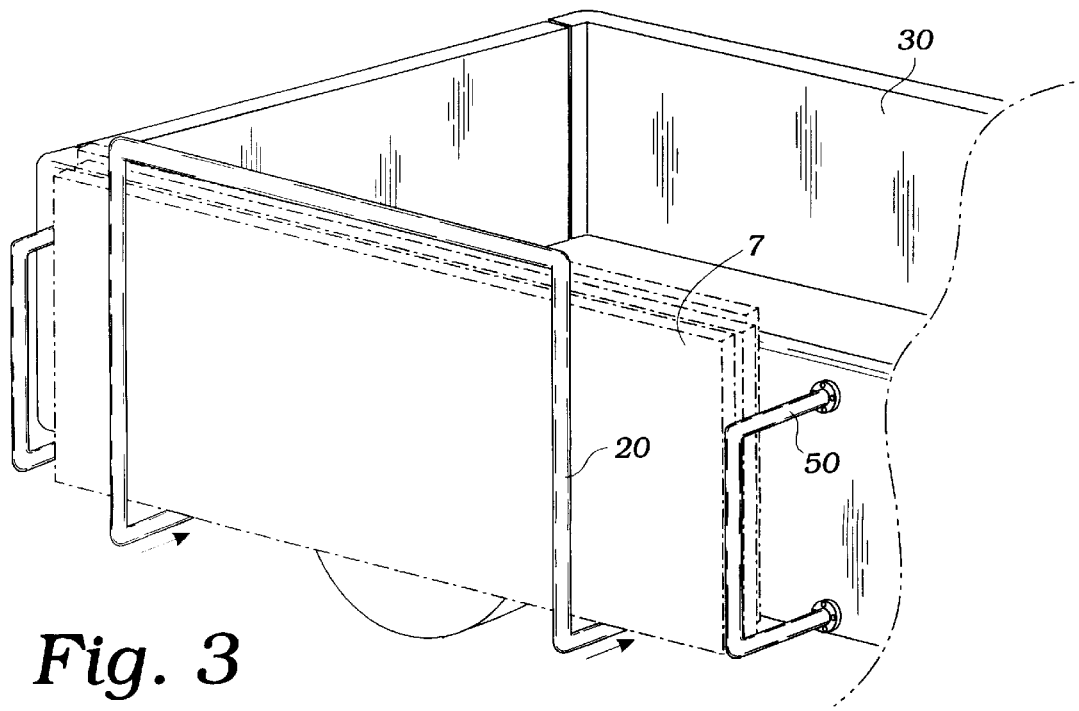
FIG. 3 is similar to FIG. 2 with arrows illustrating a closing movement for clamping a panel in the invention.

The above described drawing FIGS. 1–5 illustrates the invention, an apparatus for carrying panel materials such as gypsum wallboard or plywood sheets adjacent to a truck side panel 5. The apparatus mounts onto the truck side panel 5 and secures one or more sheets or panels which constitute the workpiece 7 for transport.

The apparatus comprises a stationary workpiece resting means 10 enabled by flanges 12 and standard hardware 14 for mounting on the truck side panel 5. A movable workpiece clamping and supporting means 20 is positioned adjacent to the stationary workpiece resting means 10 and is enabled, as will be discussed in detail below, for mounting to a truck 30 supporting the previously mentioned side panel 5. A motive means 40, such as one or more electric motors, engages with the truck 30 and enables moving the workpiece clamping and supporting means 20 toward and away from the workpiece resting means 10 for sandwiching the workpiece 7 between the workpiece resting means 10 and the workpiece clamping and supporting means 20 for enabling the truck 30 to transport the workpiece 7.

A pair of lateral restraining means 50, such as the U-shaped bars shown in the figures are attached to the truck side panel 5, in the same manner as for the workpiece resting means in positions for restraining movement of the workpiece 7 which has a tendency, when mounted as shown, to move forward during braking of the truck 30, and for moving rearward during acceleration of the truck 30.

Preferably, the stationary workpiece resting means 10 is a pair of horizontally positioned bars as best seen in FIG. 1.

Inventively, the movable workpiece clamping and supporting means 20 is adapted for telescopic movement toward and away from the stationary workpiece resting means 10 as best seen in FIGS. 2–5.

Figure 4:
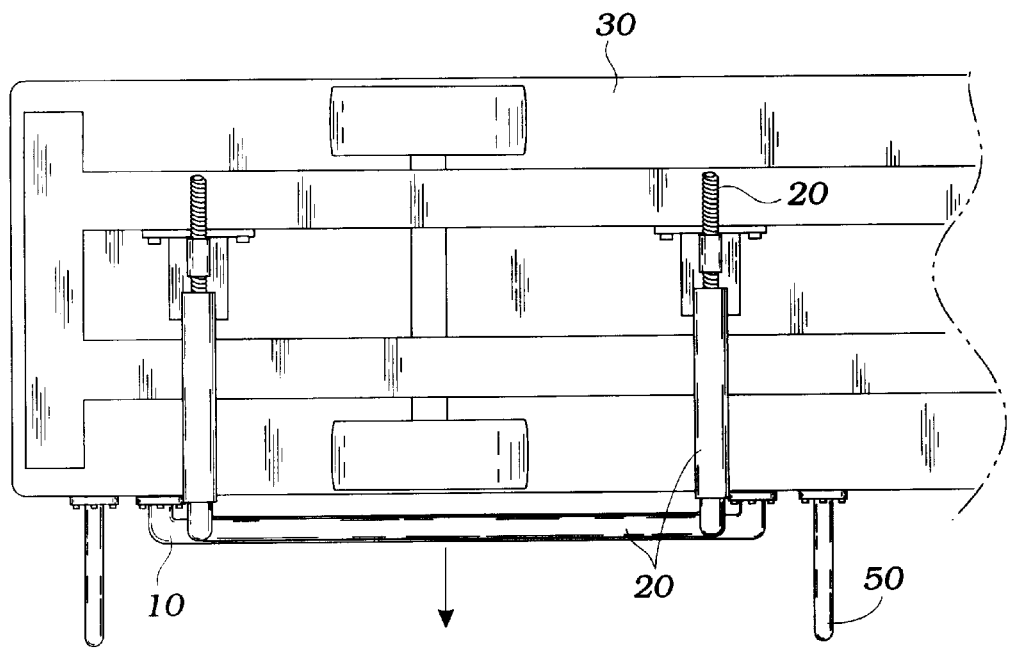
FIG. 4 is a bottom plan view with an arrow showing the manner in which the invention moves for opening.
Figure 5:
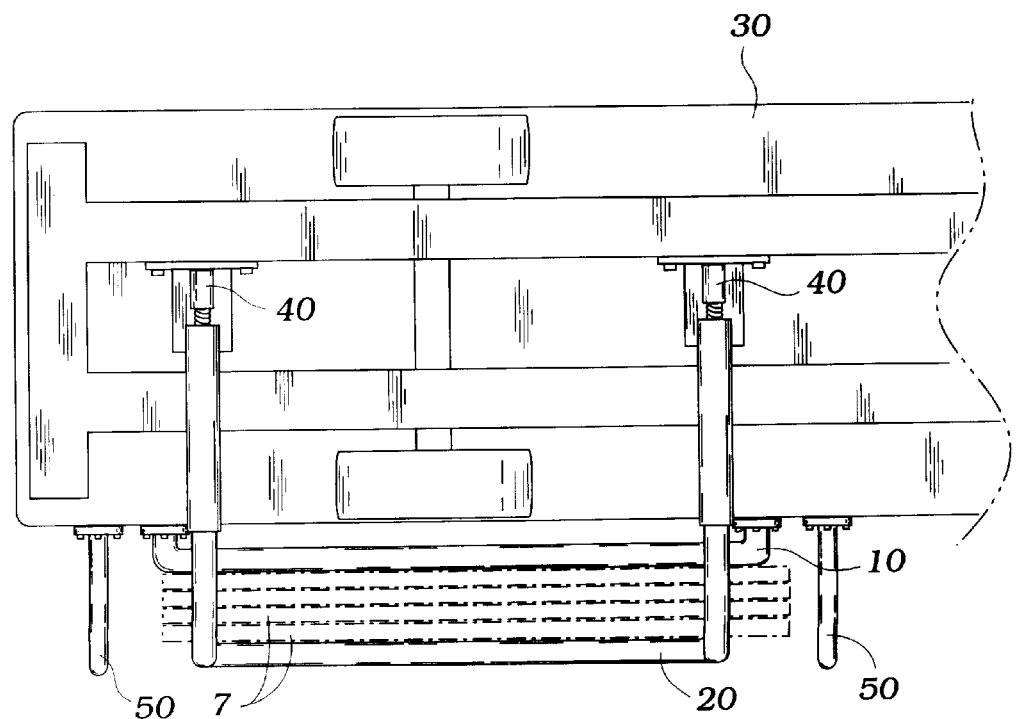
FIG. 5 is a view similar to that of FIG. 4 with an arrow showing the manner in which invention moves for clamping panels.

Inventively, the motive means 40 is a screw drive means, such as a linear motor or linear screw driven actuator as is well known in the art, and is mounted to the underchassis of the truck and engaged with the movable workpiece clamping and supporting means 20 for linear motion thereof as is best shown in FIGS. 4 and 5.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An apparatus for carrying panel materials adjacent a side panel of a vehicle, the apparatus comprising:

a stationary workpiece resting means enabled for mounting on the vehicle side panel; a movable workpiece clamping and supporting means positioned adjacent to the stationary workpiece resting means and enabled for mounting to the vehicle;

a motive means enabled for engagement with the vehicle and further enabled for moving the workpiece clamping and supporting means toward and away from the workpiece resting means for sandwiching a workpiece between the workpiece resting means and the workpiece clamping and supporting means for enabling the vehicle to transport the workpiece;

the workpiece clamping and supporting means comprising a pair of spaced apart horizontally positioned bars for resting the workpiece upon, and a U-shaped bar positioned for abutting the workpiece, the bars being configured integrally, wherein the mounting of said movable workpiece clamping and support means to the vehicle is independent from the mounting of said stationary workpiece resting means on the vehicle.

2. The apparatus of claim 1 further providing a pair of lateral restraining means for attachment to the vehicle side panel in positions for restraining movement of the workpiece.

3. The apparatus of claim 1 wherein the stationary workpiece resting means is a pair of spaced apart horizontally positioned bars.

4. The apparatus of claim 1 wherein the movable workpiece clamping and supporting means is adapted for telescopic movement toward and away from the stationary workpiece resting means so as to enable placement of the workpiece therebetween.

5. The apparatus of claim 4 wherein the motive means is a screw drive means engaged with the movable workpiece clamping and supporting means for linear motion thereof.

6. A combination apparatus for carrying panel materials, the combination comprising:

i) a vehicle;

ii) a stationary workpiece resting means mounted on a side panel of the vehicle;

iii) a movable workpiece clamping and supporting means positioned adjacent to the stationary workpiece resting means and mounted to the vehicle;

iv) a motive means engaged with the vehicle and enabled for moving the workpiece clamping and supporting means toward and away from the workpiece resting means for sandwiching a workpiece between the workpiece resting means and the workpiece clamping and supporting means for enabling the vehicle to transport the workpiece securely, the workpiece clamping and supporting means comprising a pair of spaced apart horizontally positioned bars for resting the workpiece upon, and a U-shaped bar positioned for abutting the workpiece, the bars being configured integrally, wherein the mounting of said movable workpiece clamping and support means to the vehicle is independent from the mounting of said stationary workpiece resting means on the vehicle.

7. The combination of claim 6 further providing a pair of lateral restraining means attached to the vehicle side panel in positions for restraining movement of the workpiece.

8. The apparatus of claim 6 wherein the stationary workpiece resting means is a pair of spaced apart horizontally positioned bars.

9. The apparatus of claim 6 wherein the movable workpiece clamping and supporting means is adapted for telescopic movement toward and away from the stationary workpiece resting means so as to enable placement of the workpiece therebetween.

10. The apparatus of claim 6 wherein the motive means is a screw drive means engaged with the movable workpiece clamping and supporting means for linear motion thereof.

* * * * *